(12) United States Patent
Clochard

(10) Patent No.: US 10,589,781 B2
(45) Date of Patent: Mar. 17, 2020

(54) VEHICLE STEERING-WHEEL ASSEMBLY INCLUDING MEANS FOR COMMUNICATING BY EMITTING AND RECEIVING LIGHT

(71) Applicants: CONTINENTAL AUTOMOTIVE FRANCE, Toulouse (FR); CONTINENTAL AUTOMOTIVE GMBH, Hannover (DE)

(72) Inventor: Pascal Clochard, Chevreuse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/554,764

(22) PCT Filed: Mar. 24, 2016

(86) PCT No.: PCT/EP2016/000514
§ 371 (c)(1),
(2) Date: Aug. 31, 2017

(87) PCT Pub. No.: WO2016/150571
PCT Pub. Date: Sep. 29, 2016

(65) Prior Publication Data
US 2018/0237067 A1    Aug. 23, 2018

(30) Foreign Application Priority Data
Mar. 26, 2015 (FR) ...................................... 15 52528

(51) Int. Cl.
*B62D 15/02* (2006.01)
*B60R 16/027* (2006.01)
(Continued)

(52) U.S. Cl.
CPC .......... *B62D 15/0215* (2013.01); *B60K 37/06* (2013.01); *B60R 16/027* (2013.01);
(Continued)

(58) Field of Classification Search
CPC ................ B62D 1/046; B62D 15/0205; B62D 15/0215; B62D 15/022; B60R 16/027;
(Continued)

(56) References Cited

U.S. PATENT DOCUMENTS 4,405,924 A * 9/1983 Shinoda ................. B60K 31/02
181/114
4,438,425 A * 3/1984 Tsuchida ............... B60R 16/027
250/551
(Continued)

FOREIGN PATENT DOCUMENTS

CN    1499344    5/2004
CN    1845839    10/2006
(Continued)

OTHER PUBLICATIONS

International Search Report, dated Jun. 1, 2016, from corresponding PCT/EP2016/000514 application.

*Primary Examiner* — Laura Freedman
(74) *Attorney, Agent, or Firm* — Young & Thompson

(57) ABSTRACT

Steering wheel assembly intended for being built into a vehicle dashboard and including a steering wheel and a mounting element which is stationary relative to the dashboard and the steering wheel being movable in rotation with respect to the dashboard. The steering wheel includes a plurality of light-emitting sources spaced apart so that at least one of the light sources cannot be concealed by a hand or by a portion of a hand of a driver of the vehicle. The steering wheel assembly includes a first plurality of sensors capable of picking up the light emitted by at least one
(Continued)

light-emitting source, the light-emitting sources and the sensors being configured to form a continuous communication channel between the steering wheel and an instrument panel mounted on the dashboard.

20 Claims, 2 Drawing Sheets

(51) Int. Cl.
*B60K 37/06* (2006.01)
*G01D 5/34* (2006.01)
*H04B 10/114* (2013.01)
*H04B 10/00* (2013.01)

(52) U.S. Cl.
CPC ............ *G01D 5/34* (2013.01); *H04B 10/114* (2013.01); *B60K 2370/1446* (2019.05); *B60K 2370/21* (2019.05); *B60K 2370/33* (2019.05); *B60K 2370/332* (2019.05); *B60K 2370/589* (2019.05); *B60K 2370/782* (2019.05); *H04B 10/22* (2013.01)

(58) Field of Classification Search
CPC ............ B60K 37/04; B60K 37/06; B60K 2350/1036; B60K 2350/2013; B60K 2350/203; B60K 2350/357; B60K 2350/928; B60K 2370/1446; B60K 2370/21; B60K 2370/33; B60K 2370/332; B60K 2370/589; B60K 2370/782; H04B 10/114; H04B 10/22; G01D 5/34
See application file for complete search history.

(56) References Cited

U.S. PATENT DOCUMENTS

| | | | | |
|---|---|---|---|---|
| 4,629,828 A | * | 12/1986 | Umebayashi | H04M 1/737 379/56.1 |
| 4,672,214 A | * | 6/1987 | Takahashi | B60R 16/027 250/551 |
| 4,988,973 A | * | 1/1991 | Inui | B60R 16/027 340/425.5 |
| 6,935,193 B2 | * | 8/2005 | Heisenberg | B62D 6/10 73/862.324 |
| 7,078,718 B2 | * | 7/2006 | Poslowsky | B60R 16/027 250/551 |
| 7,142,100 B2 | * | 11/2006 | Brown | B62D 15/02 340/438 |
| 7,321,311 B2 | * | 1/2008 | Rieth | B62D 1/046 180/271 |
| 7,911,350 B2 | * | 3/2011 | Shoji | B60K 28/063 340/426.11 |
| 8,775,023 B2 | * | 7/2014 | Frojdh | B62D 1/046 701/36 |
| 9,092,093 B2 | * | 7/2015 | Jubner | G06F 3/04883 |
| 9,481,297 B2 | * | 11/2016 | Salter | B62D 1/06 |
| 9,573,598 B2 | * | 2/2017 | Berezhnyy | B60K 28/06 |
| 2004/0141634 A1 | | 7/2004 | Yamamoto et al. | |
| 2005/0052426 A1 | | 3/2005 | Hagermoser et al. | |
| 2005/0189159 A1 | | 9/2005 | Weber et al. | |
| 2013/0003403 A1 | | 1/2013 | Takahira et al. | |
| 2017/0341676 A1 | * | 11/2017 | Clochard | G06F 3/0482 |

FOREIGN PATENT DOCUMENTS

| | | | | |
|---|---|---|---|---|
| CN | 102853378 | | 1/2013 | |
| DE | 10 2004 007253 B3 | | 6/2005 | |
| JP | 57011133 A | * | 1/1982 | |
| JP | 58136539 A | * | 8/1983 | ........... B60R 16/027 |
| JP | 59223538 A | * | 12/1984 | ........... B60R 16/027 |
| JP | 62218250 A | * | 9/1987 | |
| JP | 63222975 A | * | 9/1988 | |
| JP | 10029540 A | * | 2/1998 | |
| JP | 2001114066 A | | 4/2001 | |
| JP | 2003-276477 | | 9/2003 | |
| JP | 2005088792 A | * | 4/2005 | ............... B60Q 1/34 |
| JP | 2010088487 A | * | 4/2010 | |

* cited by examiner

VEHICLE STEERING-WHEEL ASSEMBLY INCLUDING MEANS FOR COMMUNICATING BY EMITTING AND RECEIVING LIGHT

The present invention concerns the communication between a steering wheel and a dashboard or, more broadly, a cockpit of an automotive vehicle.

More precisely, the present invention proposes an assembly enabling the transmission of data, in the form of infrared light, between a steering wheel, by definition movable in rotation with respect to the dashboard in a passenger compartment of a vehicle, and stationary elements with respect to said dashboard. The present invention in particular allows the exchange of data between a steering wheel and an instrument panel of a vehicle.

BACKGROUND OF THE INVENTION

One well known problem to those skilled in the art is the possibility of effectuating transmissions of data between a steering wheel, which often comprises elements of a man-machine interface, and the instrumentation cluster. In general, this data is intended to be centralized in the area of a central computer able to process said data for the purpose of generating other data and/or being transmitted to other peripheral equipment.

In fact, the steering wheels of current vehicles are increasingly including elements of a man-machine interface, for example allowing for control of a car radio, a cruise control unit, etc. The integration of these elements of a man-machine interface in the steering wheel allows the driver of the vehicle in particular to perform a certain number of adjustments and to send a certain number of commands to the central computer of the vehicle without his hands leaving the steering wheel, which improves the safety.

Thus, more precisely, the general problem to which the invention pertains is the fact that the steering wheel is movable in rotation with respect to the instrument panel and to the central computer, which raises many important problems when all of the data links are wired.

Various solutions have been proposed in the prior art, involving the integration of multiplexing elements to reduce the number of wires and connections, and mechanical interface elements such as rotary joints, with or without multiplexing unit, to provide for the wires passing through the portion which is movable in rotation—the steering wheel—to the stationary portion—the dashboard.

Thus, various data links exist, allowing in particular transmissions from the man-machine interfaces integrated in the steering wheel and going to the central computer and, ultimately, the instrument panel. These links, according to the prior art, require wiring and the corresponding transmissions engender a certain delay, especially on account of the required rotary joints, especially since the frequency is intrinsically limited, especially because of the wire-line mode of transmission. Furthermore, the need to design and deploy mechanical and electronic interfaces enabling the passage of data from the steering wheel, movable in rotation, to the stationary dashboard, produces a major complexity in the devices so deployed.

According to the recent prior art, one solution to this technical problem consists in utilizing transmission devices implementing communication protocols of the Bluetooth® type. However, these wireless communication devices of Bluetooth® type have in particular the drawback of being expensive.

Thus, there exists a need for a device, such as a steering wheel assembly of an automotive vehicle, comprising means which allow for a continual, rapid and wireless transmission of data between a steering wheel and an instrumentation cluster.

SUMMARY OF THE INVENTION

For this purpose, the present invention concerns a steering wheel assembly intended for being built into a vehicle dashboard, said steering wheel assembly comprising a steering wheel and a stationary mounting element, said stationary mounting element being intended to be stationary relative to the dashboard, while preferably being adjustable along two axes, and said steering wheel being intended to be movable in rotation with respect to said dashboard. The steering wheel assembly according to the invention is distinguished in that the steering wheel comprises a plurality of light-emitting sources, able to emit data frames in the form of light, said light-emitting sources being distributed on the steering wheel and spaced apart so that at least one of said sources cannot be concealed by either of the hands of the driver of the vehicle and in that the steering wheel assembly comprises a first plurality of sensors, secured to said stationary mounting element, said sensors being configured so that each of said sensors is capable of picking up the light emitted by at least one light-emitting source, said light-emitting sources and said sensors being configured to form a continuous communication channel in order to enable exchanges of data between the steering wheel, movable in rotation with respect to the dashboard, and an instrument panel mounted on said dashboard.

According to various embodiments, the steering wheel assembly according to the invention may furthermore comprise one or more of the following explained characteristics.

According to one embodiment, the steering wheel is substantially circular and comprises a rim, the light-emitting sources being integrated in said rim and distributed in substantially uniform manner.

For example, the steering wheel and the rim have a diameter between around 34 centimeters and around 38 centimeters and comprise between eighteen and thirty six light-emitting sources spaced apart in substantially uniform manner on the circumference of the steering wheel.

According to one embodiment, the stationary mounting element consists in a portion of dashboard, said sensors of the first plurality of sensors being integrated in an instrument panel mounted on said dashboard.

According to one possible arrangement of the steering wheel assembly according to the invention, the latter comprises three sensors integrated in an upper portion of an instrument panel mounted on said dashboard, said three sensors being distributed uniformly for a distance of around 40 centimeters, and said three sensors having a cone of reception with a vertex angle substantially equal to 20°.

According to an advanced embodiment, in the steering wheel assembly intended for being built into a vehicle dashboard according to the invention, the steering wheel furthermore comprises a second plurality of sensors, integrated in the steering wheel, said sensors of the second plurality of sensors cooperating with the plurality of light-emitting sources in such a way that said light-emitting sources emit light going to the sensors of the first plurality of sensors, said light being susceptible of being reflected by a hand of the driver of the vehicle placed on the steering wheel in the direction of sensors of the second plurality of sensors, making it possible to detect the presence of that hand on the steering wheel, said light-emitting sources and the totality of the sensors of the first and second pluralities of sensors cooperating in order to ensure a dual function of detecting the presence of a hand or two hands of the driver on the steering wheel, by means of the light-emitting sources concealed by said hand or hands, and the sensors of the second plurality of sensors, and of forming a continuous communication channel between the steering wheel and an instrument panel mounted on said dashboard, by means of the light-emitting sources not concealed by said hand or hands and the sensors of the first plurality of sensors Advantageously, the light emitted by the light-emitting sources has a wavelength in the infrared range.

For example, the infrared light-emitting sources are infrared diodes.

According to another advanced embodiment, which may be combined with the embodiments presented above, the light-emitting sources and the sensors of the first plurality of sensors have a unique identifier, the unique identifier of the light-emitting sources being integrated in the data frames emitted in the form of light by said light-emitting sources, making it possible when a sensor picks up the light to determine the light-emitting source having emitted the light so picked up, and to calculate by interpolation the angular position of the steering wheel.

The present invention also deals with a dashboard assembly, comprising a dashboard, as well as a steering wheel assembly as briefly described above.

The invention furthermore covers an automotive vehicle comprising such a dashboard assembly.

BRIEF DESCRIPTION OF THE DRAWINGS

The invention will be better understood upon perusal of the following description, given solely as an example, and referring to the appended drawings, in which.

DETAILED DESCRIPTION OF THE PREFERRED EMBODIMENTS

It should be noted that the figures explain the invention in detailed manner to allow its implementation, said figures also serving of course for a better definition of the invention.

The invention is presented primarily for the purpose of an integration in an automotive vehicle. However, other applications are likewise contemplated by the present invention, especially for the purpose of an integration in any type of land or nautical vehicle.

Figure 1:
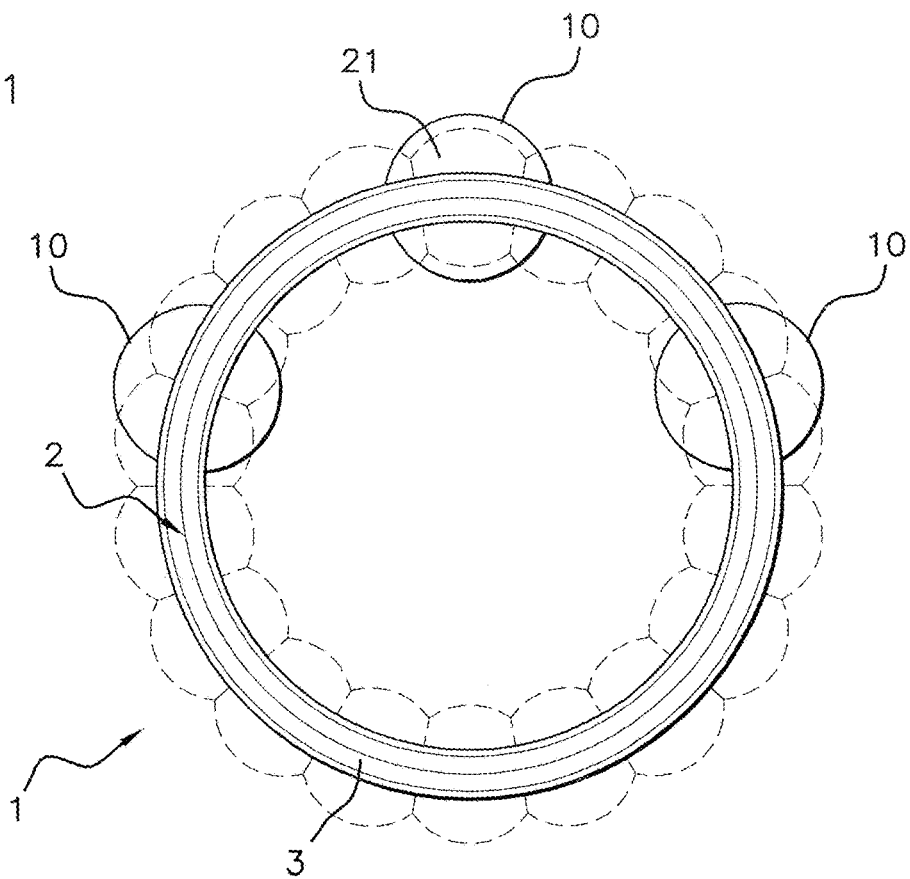
FIG. 1 represents the diagram of a steering wheel assembly according to the invention, front view.
Figure 2:
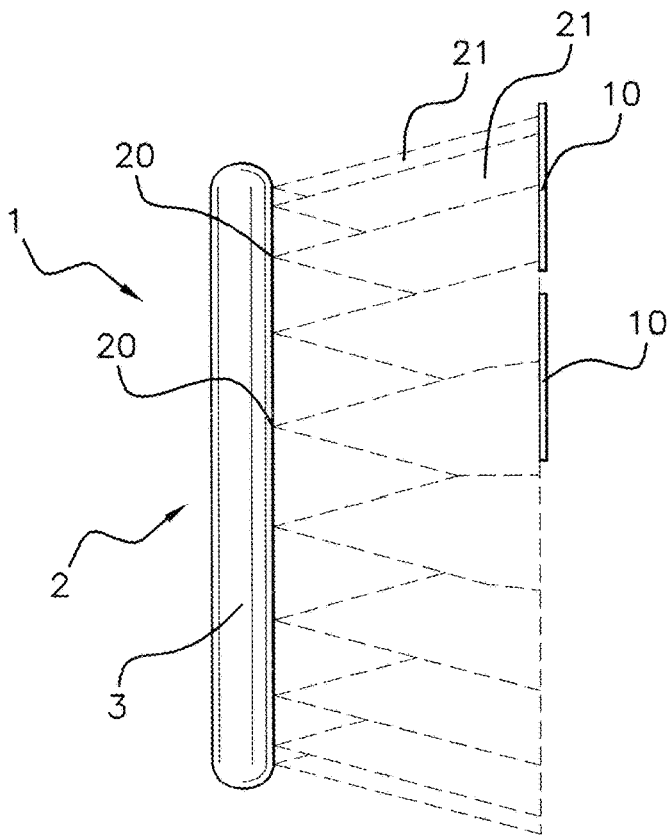
FIG. 2 represents the diagram of a steering wheel assembly according to the invention, profile view.
Figure 3:
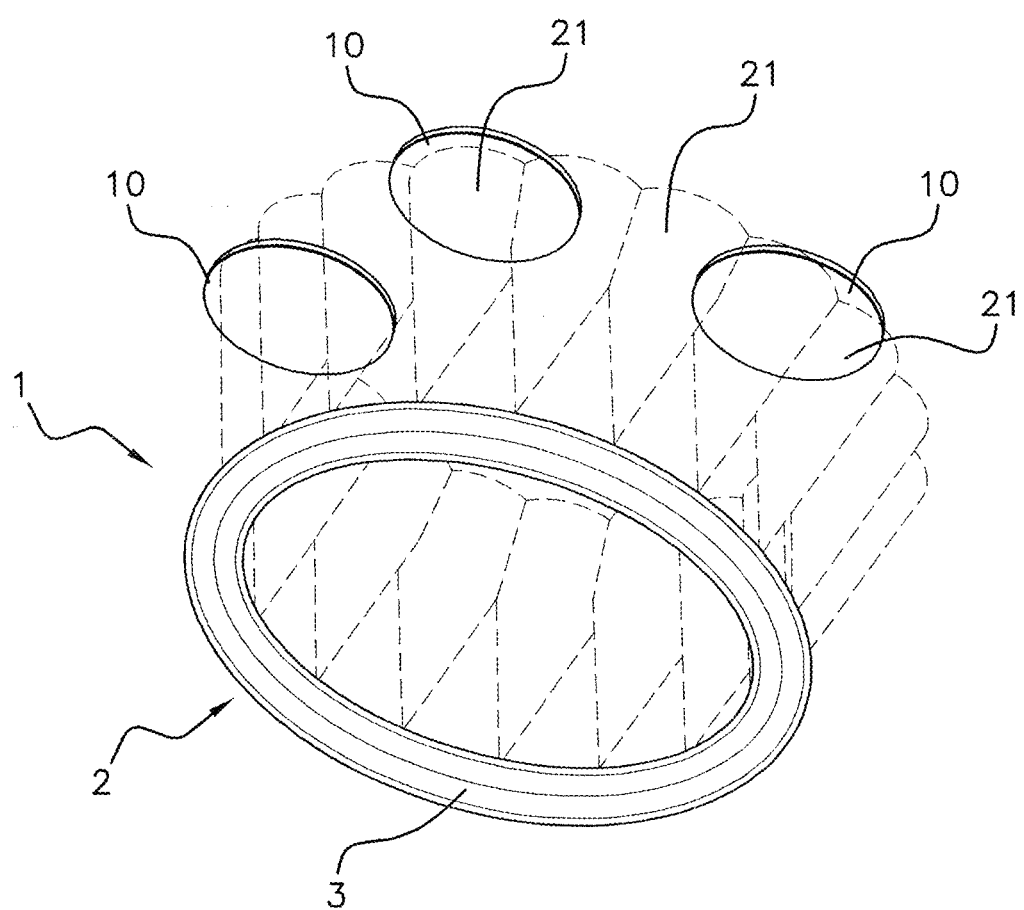
FIG. 3 represents the diagram of a steering wheel assembly according to the invention, perspective view.

FIGS. 1 to 3 show, from different viewing angles, the same embodiment, not limiting of the steering wheel assembly 1 according to the invention.

The steering wheel assembly 1 comprises a first plurality of sensors, disposed on a stationary support, not shown. The sensors of the first plurality of sensors are represented, in FIGS. 1 to 3, in the schematic form of receiving zones 10 identified with said sensors for purposes of the following explanations.

The sensors 10 are typically integrated in an instrument panel. For example, they may be secured on the dashboard or integrated in the instrumentation cluster.

A plurality of sources 20, able to illuminate the plurality of sensors 10, are lodged in the steering wheel 2. In particular, the sources 20 are preferably distributed uniformly over the circumference of the steering wheel 2, substantially circular, for example being integrated in the rim 3 of said steering wheel 2.

The number of sources 20, their disposition on the steering wheel 2, especially their distance from one another, the characteristics of propagation of the light emitted, which can be modeled for example in the form of a cone of emission 21, and the relative position of the light sources 20 with respect to the sensors 10, as well as the number of sensors 10, their position and the characteristics of the field of vision of said sensors 10, which can be modeled in the form of cones of reception of the light emitted by the sources, are configured such that, at any given time, at least one source 20 cannot be hidden by a hand of the driver placed on the rim of the steering wheel and at least one sensor of the first plurality of sensors 10 "sees" this source 20.

Thus, by choice of technology, the number, the form, and the cone of emission of the sources 20 may evolve.

The number of sources 20 may be between six and eighty. According to a preferred embodiment, between eighteen and thirty six light sources 20 are distributed over 360° of the rim 3 of the steering wheel 2. In particular, according to one embodiment, the light sources 20 number eighteen.

The typical light sources 20 are diodes having a cone of emission with a vertex angle equal to around 20°.

The sensors 10 may number three, for example, and have a cone of reception with a vertex angle of 120°. According to one possible configuration of the steering wheel assembly 1 according to the invention, said sensors 10 may be integrated in the instrument panel. Thus, the sensors are typically integrated in the instrument panel and distributed for a distance of 30 cm to 60 cm, being thus separated by around 15 cm to 30 cm.

Depending on the choice of technology, the number, the form, and the cone of reception of the sensors 10 may evolve. Typically, the sensors 10 number three and may have a cone of reception of the light emitted by the light sources 20 with a vertex angle equal to around 120°.

A first function of this combination of light sources 20 integrated in the rim 3 of the steering wheel 2 and of sensors 10 secured to the dashboard is the possibility of transmitting data frames, encoded in the form of a light signal, the light corresponding to these light signals being emitted by the light sources 20 and picked up by the sensors 10. This data, regarding for example commands received via man-machine interfaces situated in the zone of the steering wheel, once received by the sensors 10 disposed on the dashboard of the instrument panel, can be relayed directly to peripheral equipment or to a central computer able to process this data.

The arrangement and the characteristics of the sources 20 and the sensors 10 being such that at least one of the sources 20 is always visible to at least one of the sensors 10, and thus to the instrument panel, the communication channel so established between the steering wheel 2 and the instrument panel is continuous. In this context, by continuous communication channel it is meant that, in nominal functioning, there is no time when no data cannot be transmitted from the steering wheel 2 to the instrument panel, given that there always exists at least one source 20 able to emit data, that is, one source 20 not concealed by a hand of the driver, that is visible to at least one sensor 10.

According to one preferred embodiment, furthermore, the light sources 20 emit light having a wavelength in the infrared range and the sensors 10 of the first plurality of sensors are able to pick up the corresponding infrared light.

For example, the light sources 20 may be infrared diodes and the sensors 10 may be infrared sensors. In the embodiment whereby said light sources 20 are integrated in the rim 3 of the steering wheel 2, the latter is at least partly made of a material transparent to the wavelength of light emitted by said sources 20, and thus to infrared light, as the case may be.

According to an advanced embodiment of the present invention, the light sources 20 integrated in the steering wheel cooperate with a second plurality of sensors (not shown), integrated in the rim 3 of the steering wheel 2, to provide a second function, regarding the detection of the presence of a hand, of both hands, or of one or more fingers on the steering wheel. In fact, the presence of one hand or a portion of a hand opposite a light source 20 reflects a portion of the light. The sensors of the second plurality of sensors, integrated in the rim 3 of the steering wheel 2, typically in staggered arrangement with the light sources 20, are designed to receive the light reflected by the hand or the portion of a hand.

Means of analysis of the light picked up by the second plurality of sensors make it possible to determine the quantity of light received by the second plurality of sensors by virtue of the reflection, by one hand or a portion of a hand, of a portion of the light emitted by said source to one or more sensors of the second plurality of sensors.

The sensors of the second plurality of sensors are, for example, photodiodes disposed in alternating manner between the light sources 20.

According to another advanced embodiment, which may easily be combined with the previously described embodiments, the steering wheel assembly 1 according to the invention enables a precise determination of the angular position of the steering wheel 2. In fact, for this purpose, the light sources 20 and the sensors 10 of the first plurality of sensors have an identifier, the identifier of the source 20 being integrated in the data frames emitted in the form of light going to the sensors 10. Hence, the data received by the sensors 10 makes it possible, by calculation as a function of the light signal received and the identifier of the source 20 having emitted said light signal and the identifier of the sensor 10 having received it, to define the relative position of said source 20, integrated in the steering wheel movable in rotation, and of said sensor 10 secured to the dashboard, making it possible to determine the angular position of the steering wheel 2.

Thus, the sources 20 may be independent or not. If they are independent, this allows an independent control of the frequency of emission of light by said sources, thereby optimizing the implementing of the advanced embodiment described above. Thus, when a hand or a finger placed in front of a light source 20 prevents the latter from emitting data frames, said light source 20 is uniquely mobilized for the function of detecting the presence of a hand or a portion of a hand on the rim 3 of the steering wheel 2.

Thus, summarizing, the present invention concerns a steering wheel assembly enabling the providing of a continuous wireless communication channel, in particular by infrared transmission, between a steering wheel and an instrument panel.

According to an advanced embodiment, besides the exchanging of data between the steering wheel and the instrument panel, the steering wheel assembly according to the invention enables the detection of a hand or a portion of a hand placed on the steering wheel.

Furthermore, it is stipulated that the present invention is not limited to the examples described above and it is susceptible of many variants accessible to the person skilled in the art.

The invention claimed is:

1. A steering wheel assembly that attaches to a dashboard of a vehicle, said steering wheel assembly (1) comprising:
    a steering wheel (2) that is substantially circular and having a rim (3), and a stationary mounting element, said steering wheel (2) being configured so as to be movable in rotation with respect to said dashboard and said stationary mounting element,
    the steering wheel (2) including a plurality of light-emitting sources (20) that emit light in a manner that constitutes data frames, said light-emitting sources (20) being distributed in a substantially uniform manner along a surface of the steering wheel (2) and spaced apart from each other in a manner such that, when the steering wheel is gripped by one or two hands of a driver during operation of the vehicle, at least one of said light-emitting sources (20) remains uncovered by the one or two hands of the driver; and
    a first plurality of sensors (10), secured to said stationary mounting element, said sensors (10) being configured so that each of said sensors (10) is capable of receiving and registering light emitted by any of said light-emitting sources (20),
    said light-emitting sources (20) and said sensors (10) being configured to form a continuous communication channel in order to enable exchanges of data between the steering wheel (2) and the first plurality of sensors (10).

2. The steering wheel assembly as claimed in claim 1,
    wherein the steering wheel (2) and the rim (3) have a diameter between thirty-four centimeters and thirty-eight centimeters, and
    wherein the steering wheel comprises between eighteen and thirty six light-emitting sources (20) spaced apart in a substantially uniform manner along a circumference of the steering wheel (2).

3. The steering wheel assembly as claimed in claim 2, wherein said sensors of the first plurality of sensors (10) are integrated with an instrument panel mounted on said dashboard.

4. The steering wheel assembly as claimed in claim 2, wherein the steering wheel (2) further comprises a second plurality of sensors integrated in the steering wheel and configured to receive light emitted by the light-emitting sources (20) and reflected by a hand of the driver of the vehicle gripping the steering wheel (2) during operation of the vehicle in order to detect a presence of the hand on the steering wheel (2).

5. The steering wheel assembly as claimed in claim 2, wherein the light emitted by said light-emitting sources has a wavelength in the infrared range.

6. The steering wheel assembly as claimed in claim 2, wherein the light-emitting sources (20) and the sensors (10) of the first plurality of sensors have a unique identifier, the unique identifier of the light-emitting sources (20) being integrated in the data frames emitted in the form of light by said light-emitting sources (20), making it possible when a sensor (10) picks up the light to determine the light-emitting source (20) having emitted the light so picked up, and to calculate by interpolation the angular position of the steering wheel (2).

7. The steering wheel assembly as claimed in claim 1, wherein said sensors of the first plurality of sensors (10) are integrated with an instrument panel mounted on said dashboard.

8. The steering wheel assembly as claimed in claim 7, wherein said first plurality of sensors (10) include three sensors integrated in an upper portion of the instrument panel of said dashboard, said three sensors being distributed uniformly at a distance of forty centimeters, and said three sensors having a cone of reception with a vertex angle substantially equal to 120°.

9. The steering wheel assembly as claimed in claim 8, wherein the steering wheel (2) further comprises a second plurality of sensors integrated in the steering wheel and configured to receive light emitted by the light-emitting sources (20) and reflected by a hand of the driver of the vehicle gripping the steering wheel (2) during operation of the vehicle in order to detect a presence of the hand on the steering wheel (2).

10. The steering wheel assembly as claimed in claim 8, wherein the light emitted by said light-emitting sources has a wavelength in the infrared range.

11. The steering wheel assembly as claimed in claim 7, wherein the steering wheel (2) further comprises a second plurality of sensors integrated in the steering wheel and configured to receive light emitted by the light-emitting sources (20) and reflected by a hand of the driver of the vehicle gripping the steering wheel (2) during operation of the vehicle in order to detect a presence of the hand on the steering wheel (2).

12. The steering wheel assembly as claimed in claim 7, wherein the light emitted by said light-emitting sources has a wavelength in the infrared range.

13. The steering wheel assembly as claimed in claim 7, wherein the light-emitting sources (20) and the sensors (10) of the first plurality of sensors have a unique identifier, the unique identifier of the light-emitting sources (20) being integrated in the data frames emitted in the form of light by said light-emitting sources (20), making it possible when a sensor (10) picks up the light to determine the light-emitting source (20) having emitted the light so picked up, and to calculate by interpolation the angular position of the steering wheel (2).

14. The steering wheel assembly as claimed in claim 1, wherein the steering wheel (2) further comprises a second plurality of sensors integrated in the steering wheel and configured to receive light emitted by the light-emitting sources (20) and reflected by a hand of the driver of the vehicle gripping the steering wheel (2) during operation of the vehicle in order to detect a presence of the hand on the steering wheel (2).

15. The steering wheel assembly as claimed in claim 14, wherein the light emitted by said light-emitting sources has a wavelength in the infrared range.

16. The steering wheel assembly as claimed in claim 1, wherein the light emitted by said light-emitting sources has a wavelength in the infrared range.

17. The steering wheel assembly as claimed in claim 16, wherein said by said light-emitting sources are infrared diodes.

18. The steering wheel assembly as claimed in claim 1, wherein the light-emitting sources (20) and the sensors (10) of the first plurality of sensors have a unique identifier, the unique identifier of the light-emitting sources (20) being integrated in the data frames emitted in the form of light by said light-emitting sources (20), making it possible when a sensor (10) picks up the light to determine the light-emitting source (20) having emitted the light so picked up, and to calculate by interpolation the angular position of the steering wheel (2).

19. A dashboard assembly, comprising a dashboard configured to be integrated into a cockpit of a vehicle, further comprising a steering wheel assembly (1) as claimed in claim 1.

20. An automotive vehicle comprising a dashboard assembly as claimed in claim 19.

* * * * *